US009218823B2

(12) United States Patent
Kief et al.

(10) Patent No.: US 9,218,823 B2
(45) Date of Patent: Dec. 22, 2015

(54) READ HEAD WITH MULTIPLE READER STACKS

(71) Applicant: Seagate Technology LLC, Cupertino, CA (US)

(72) Inventors: Mark Thomas Kief, Lakeville, MN (US); Dimitar Velikov Dimitrov, Edina, MN (US); Thomas Roy Boonstra, Chaska, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/189,101

(22) Filed: Feb. 25, 2014

(65) Prior Publication Data

US 2015/0243301 A1     Aug. 27, 2015

(51) Int. Cl.
*G11B 5/39* (2006.01)
*G11B 5/265* (2006.01)
*G11B 5/11* (2006.01)
*G11B 5/48* (2006.01)

(52) U.S. Cl.
CPC .. *G11B 5/11* (2013.01); *G11B 5/39* (2013.01); *G11B 5/3932* (2013.01); *G11B 5/3958* (2013.01); *G11B 5/4853* (2013.01)

(58) Field of Classification Search
CPC .......... G11B 5/33; G11B 5/39; G11B 5/3906; G11B 5/3912; G11B 5/3929; G11B 5/3945; G11B 5/3948; G11B 5/3958; G11B 5/3932; G11B 5/397; G11B 5/3977

USPC ......... 360/314, 316, 319, 322, 324.1, 324.11, 360/324.12, 324.2, 315, 321
See application file for complete search history.

(56) References Cited

U.S. PATENT DOCUMENTS

| 8,208,228 B2* | 6/2012 | Maat et al. ............... 360/314 |
| 8,243,398 B2* | 8/2012 | Partee et al. ............. 360/314 |
| 8,786,987 B2* | 7/2014 | Edelman et al. ........ 360/324.12 |
| 8,891,207 B1* | 11/2014 | Li et al. ................... 360/316 |
| 9,082,435 B1* | 7/2015 | Braganca et al. .... G11B 5/3948 |
| 2004/0021982 A1* | 2/2004 | Ozue et al. ................ 360/121 |
| 2006/0028772 A1* | 2/2006 | Raastad .................... 360/315 |
| 2007/0019335 A1* | 1/2007 | McFadyen ................ 360/316 |
| 2011/0069413 A1* | 3/2011 | Maat et al. ............... 360/234.3 |
| 2011/0134572 A1 | 6/2011 | Qiu et al. |
| 2013/0286502 A1 | 10/2013 | Erden et al. |
| 2013/0286511 A1 | 10/2013 | Erden et al. |
| 2014/0177102 A1* | 6/2014 | Kief et al. ................ 360/128 |
| 2015/0170678 A1* | 6/2015 | Mastain ................. G11B 5/11 |

* cited by examiner

*Primary Examiner* — Jefferson Evans
(74) *Attorney, Agent, or Firm* — Hollingsworth Davis, LLC

(57) ABSTRACT

A read head includes a bottom shield and a bottom isolation layer that electrically isolates the bottom shield. The read head includes left and right reader stacks having respective bottom layers disposed on at least a portion of the bottom isolation layer. The left and right reader stacks are cross-track adjacent to one another. The read head also includes left and right bottom contacts electrically coupled to respective left and right bottom layers. A top shield is configured as a common top contact electrically coupled to respective top layers of the left and right reader stacks.

18 Claims, 7 Drawing Sheets

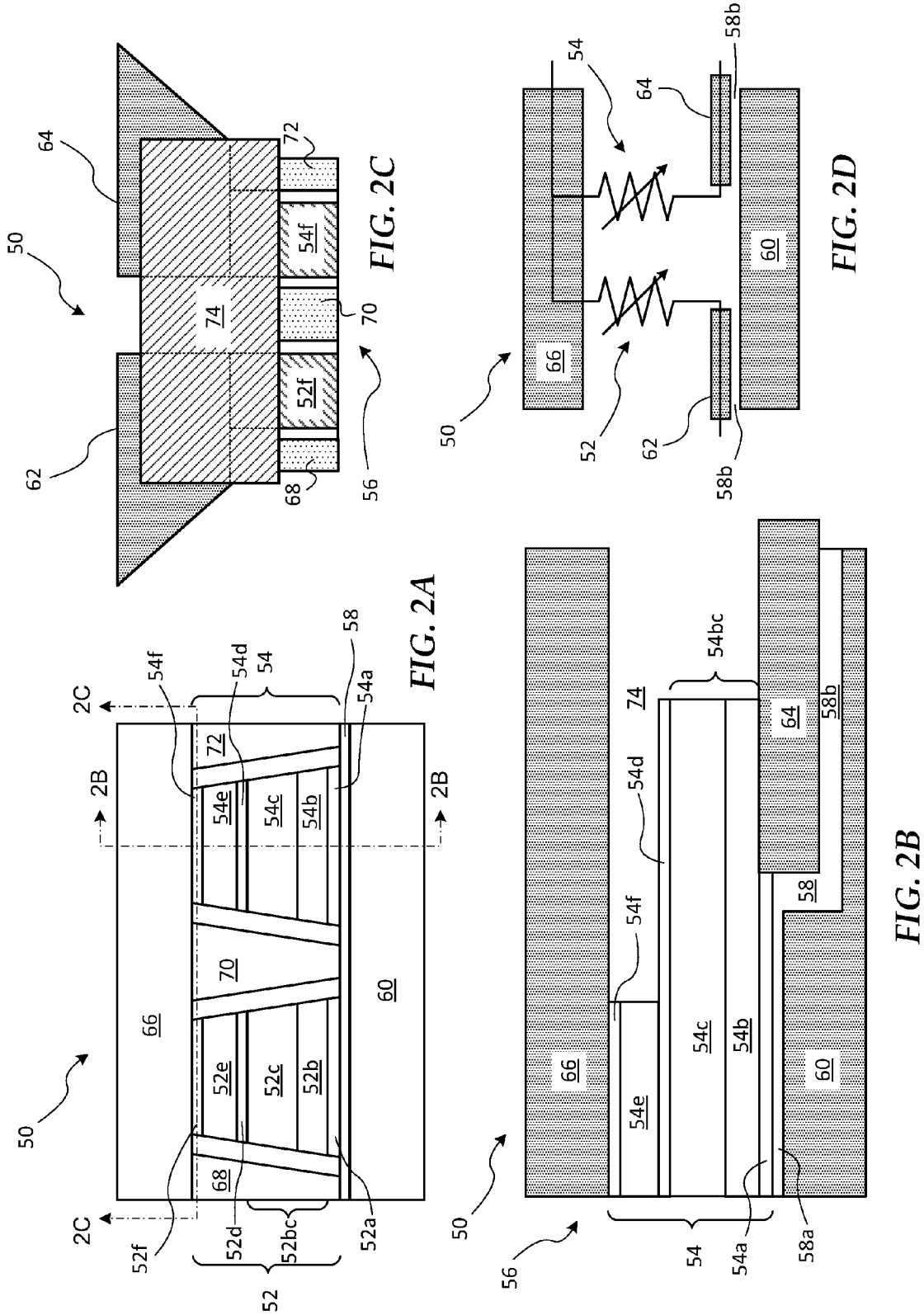

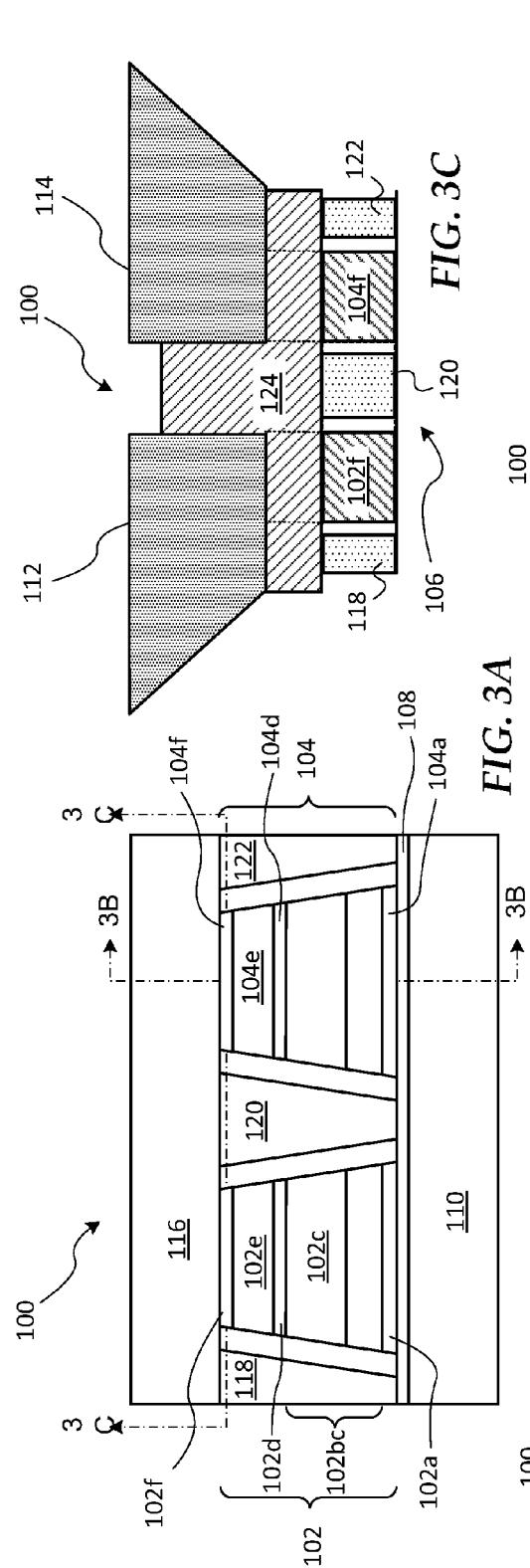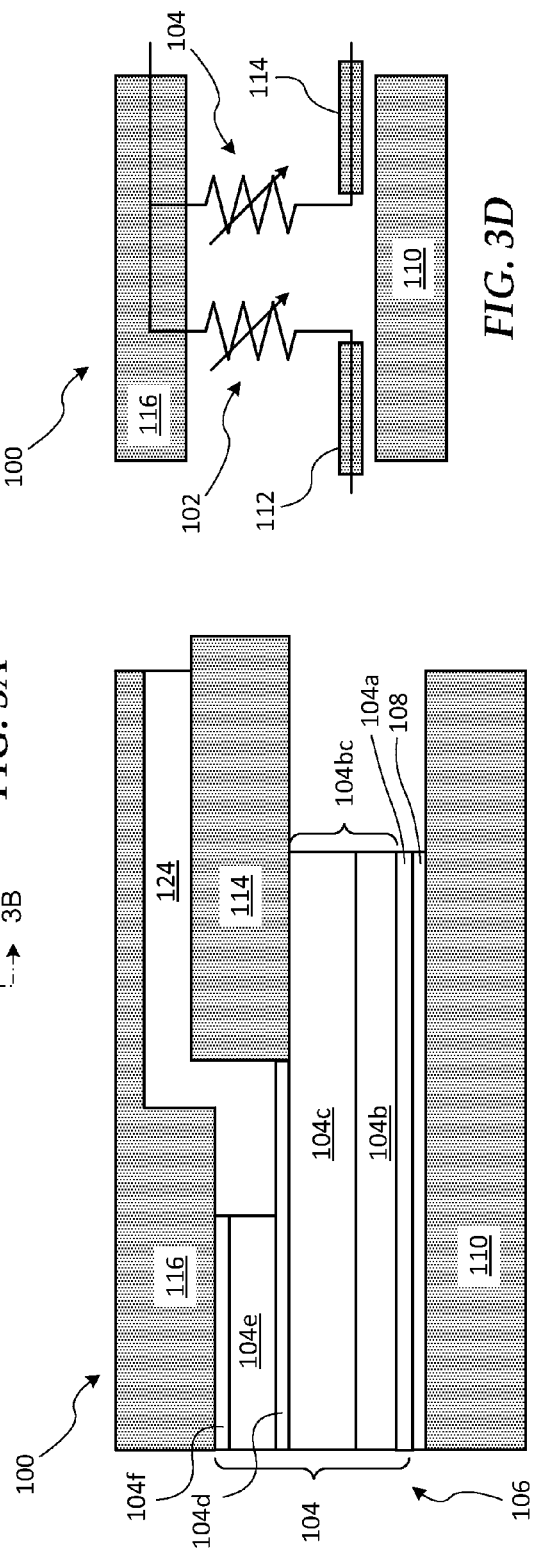

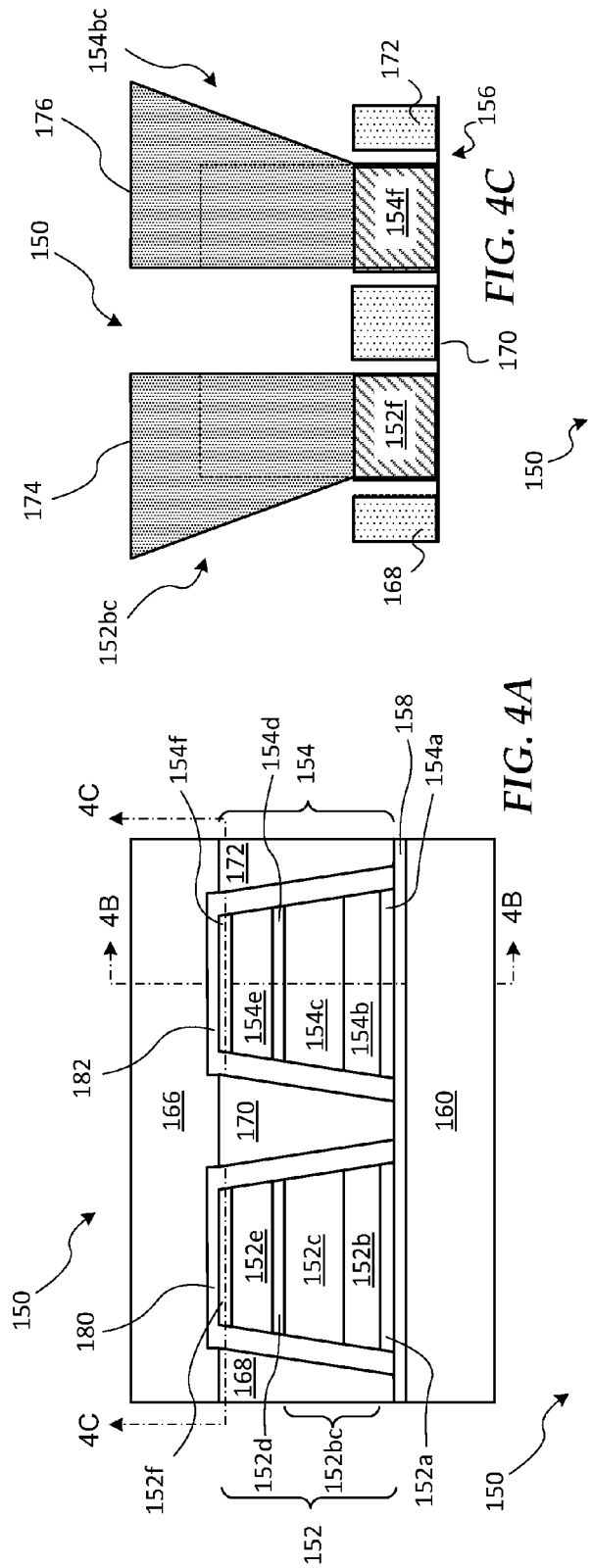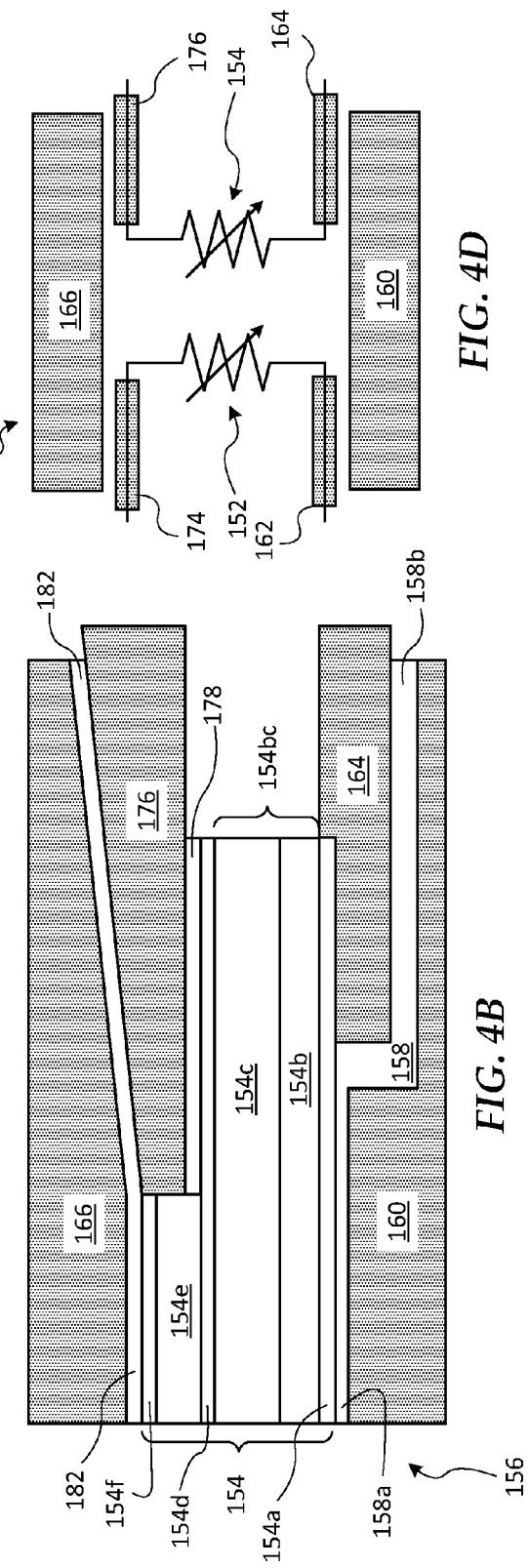

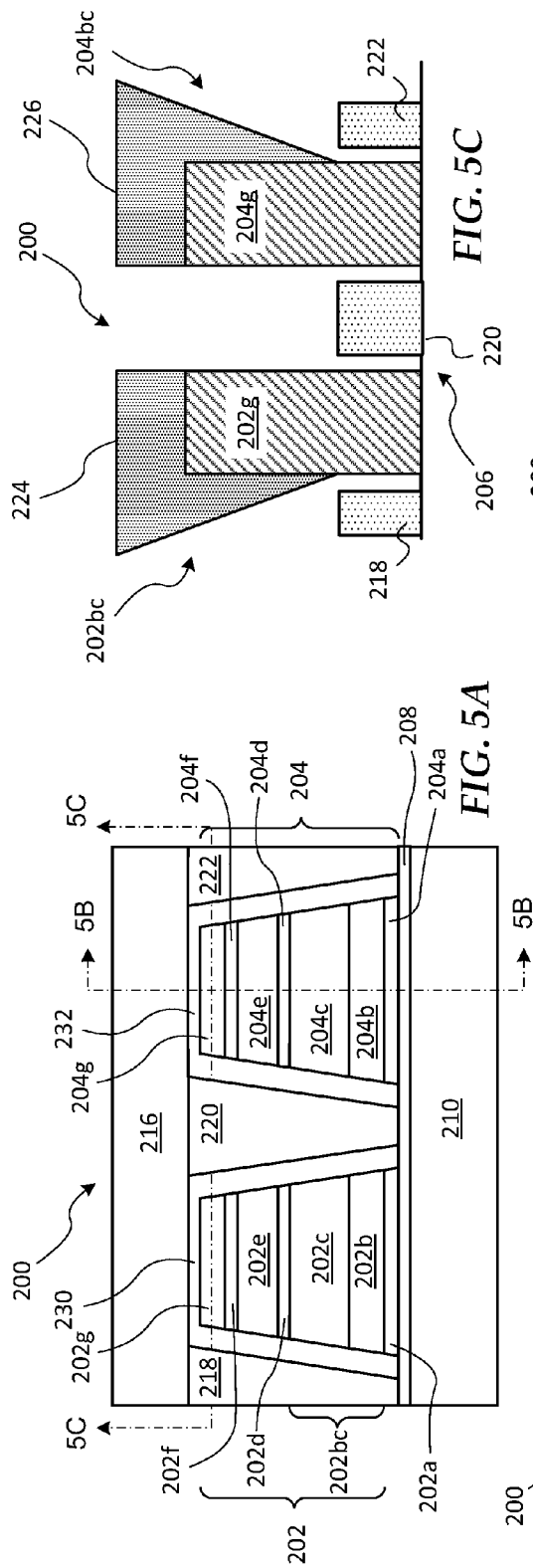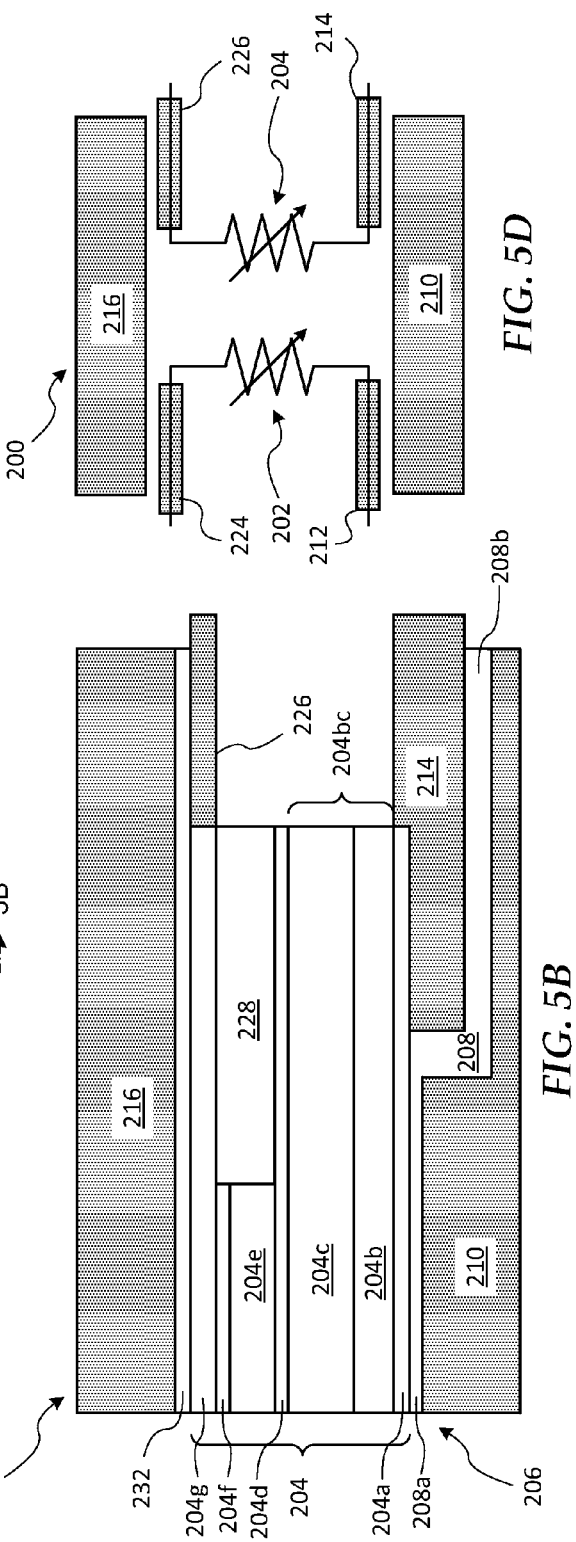

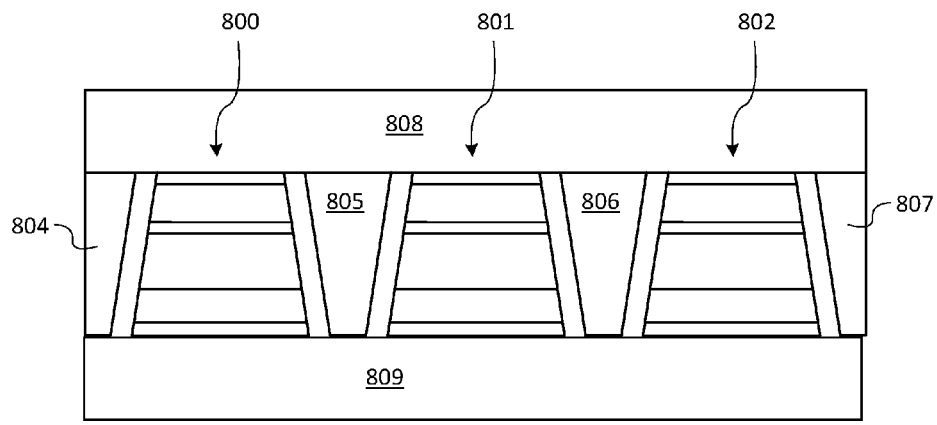
FIG. 8A
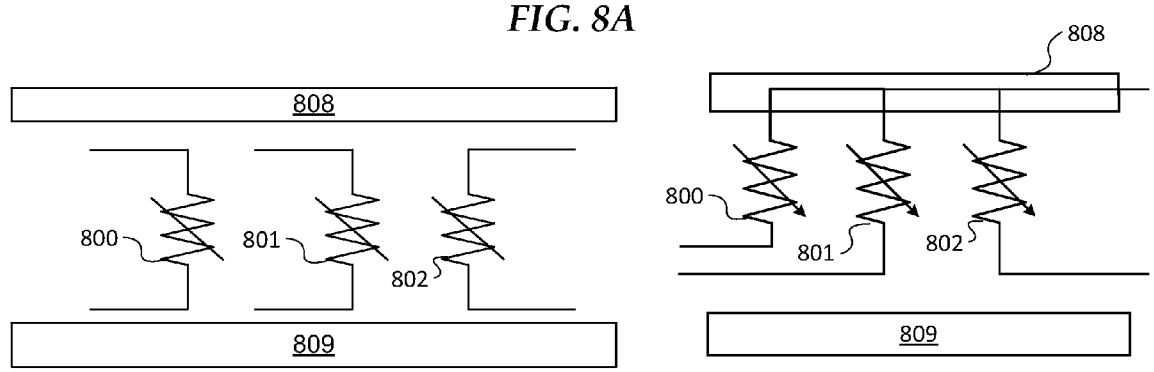
FIG. 8B
FIG. 8C
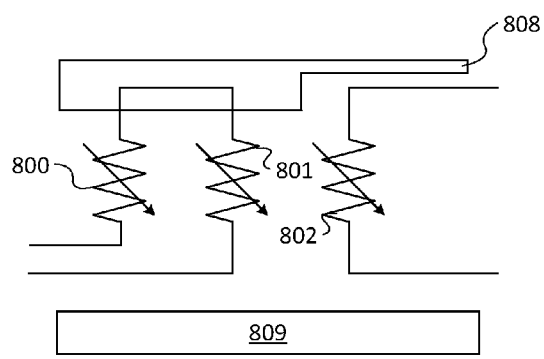
FIG. 8D
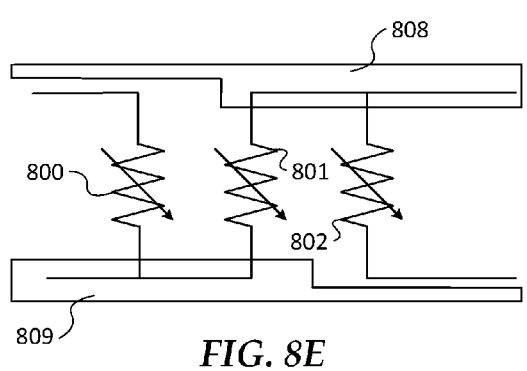
FIG. 8E

READ HEAD WITH MULTIPLE READER STACKS

SUMMARY

The present disclosure generally relates to magnetic read heads. In one embodiment, a read head includes a bottom shield and a bottom isolation layer that electrically isolates the bottom shield. The read head includes left and right reader stacks having respective bottom layers disposed on at least a portion of the bottom isolation layer. The left and right reader stacks are cross-track adjacent to one another. The read head also includes left and right bottom contacts electrically coupled to respective left and right bottom layers. A top shield is configured as a common top contact electrically coupled to respective top layers of the left and right reader stacks. Embodiments of read heads having two or more adjacent reader stacks are disclosed. In some embodiments, the read heads include an individual pair of electrical contacts for each reader stack.

BRIEF DESCRIPTION OF THE DRAWINGS

FIG. 2A is a plan view of a media-reading surface in an embodiment of a read head;

FIG. 2B is a cross-sectional view along section line 2B-2B of the read head of FIG. 2A;

FIG. 2C is a sectional view along line 2C-2C of the read head of FIG. 2A;

FIG. 2D is an electrical circuit representation of the read head of FIG. 2A;

FIG. 3A is a plan view of a media-reading surface in another embodiment of a read head;

FIG. 3B is a cross-sectional view along section line 3B-3B of the read head of FIG. 3A;

FIG. 3C is a sectional view along line 3C-3C of the read head of FIG. 3A;

FIG. 3D is an electrical circuit representation of the read head of FIG. 3A;

FIG. 4A is a plan view of a media-reading surface in yet another embodiment of a read head;

FIG. 4B is a cross-sectional view along section line 4B-4B of the read head of FIG. 4A;

FIG. 4C is a sectional view along line 4C-4C of the read head of FIG. 4A;

FIG. 4D is an electrical circuit representation of the read head of FIG. 4A;

FIG. 5A is a plan view of a media-reading surface in an embodiment of a read head;

FIG. 5B is a cross-sectional view along section line 5B-5B of the read head of FIG. 5A;

FIG. 5C is a sectional view along line 5C-5C of the read head of FIG. 5A;

FIG. 5D is an electrical circuit representation of the read head of FIG. 5A;

FIG. 8A is a plan view of a media-reading surface in an embodiment of a read head with more than two reader stacks; and FIGS. 8B-8E are electrical circuits representations of the read head of FIG. 5A according to example embodiments.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Data storage systems may include one or more magnetic heads each having a transducer configured to write and read information to and from a magnetic storage medium. The quantity of data that can be stored (e.g., written) within an area of the magnetic storage medium is generally known as the "areal density." For increasing the data rate when reading high areal density data, some magnetic heads may include multiple read heads configured for reading data from one or more tracks of the magnetic storage medium. The amount of data that can be read and processed by a read head having multiple readers increases proportionally to the number of readers. For instance, a two reader read head can be configured to read twice the amount of data read by a read head having a single reader.

In some devices, multiple (e.g., two or more) nearly independent readers are defined and integrated in an "adjacent" reader configuration in which two or more readers are located cross-track from each other. This is sometimes referred to as two-dimensional magnetic recording (TDMR). For purposes of this disclosure, "cross-track adjacent" refers to two or more readers that are separated from each other in a cross-track direction, which is a direction at an angle to (e.g., normal or nearly normal to) the tracks of the recording medium. The readers in such a case may be aligned with each other or offset from each other in a downtrack direction, which is aligned with the tracks of the recording medium. The distance between the readers may vary depending on system design, e.g., track pitch, track width, interference, overlapping of readers, etc., and the term "adjacent" is not meant to limit the embodiments to a particular reader-to-reader cross track separation or alignment.

Figure 1A:
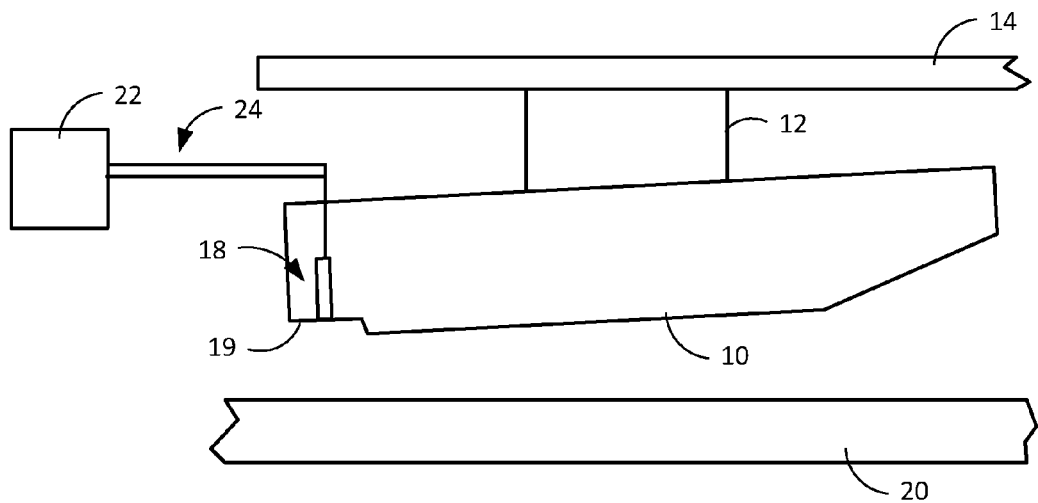
FIG. 1A is a block diagram of a read head according to an example embodiment.

In reference now to FIG. 1A, a block diagram shows a side view of read head 10 according to an example embodiment. The read head 10 (sometimes referred to as a slider) is coupled to arm 14 by way of a suspension 12. The read head 10 includes two or more cross-track adjacent read transducers 18 at a trailing edge. The read transducers 18 are located at a media facing surface 19 that is held proximate to a moving recording medium 20, e.g., a magnetic disk. The movement of the medium 20 causes the read transducers 18 to be exposed to changing magnetic fields, which causes a signal from the read transducers 18 to be detected by control circuitry 22. The control circuitry 22 is coupled to the read transducers 18 by way of control lines 24, and may read independent signals from each of the read transducers 18. The read head 10 may include write transducers (not shown), in which case it may be referred to as a read/write head. The control circuitry 22 may include processors operable via firmware and/or software instructions.

Adjacent reader designs may use top and bottom shields as electrical contacts similar to single reader designs. However, for the readers to operate independently, they will each have at least one dedicated line, isolated from the other reader. For nearby, adjacent sensors, this may involve splitting one or both shields to achieve electrical isolation of the readers. The shield split introduces a magnetic break or discontinuity in the shield in close proximity to the reader. The break between the shield portions may be a source of domain wall nucleation, pinning (which will produce a stray field to disturb the readers), and noise. For these reasons it may desirable to have contiguous shields that encompass both readers, while still providing at least one electrically-isolated electrical connection to each of the readers.

Some embodiments of single-track read heads include two or more single readers that are positioned (e.g., formed) cross-track adjacent each other. A read head having multiple adjacent readers may use multiple leads (or contacts) for the readers in the read head. For example, a three-contact two-reader read head may be coupled to controller circuitry via one independent lead for each of the two adjacent readers and a common lead shared by the two readers. A four-contact two-reader read head may be coupled to controller circuitry via two independent leads for each of the two adjacent readers.

Figure 1B:
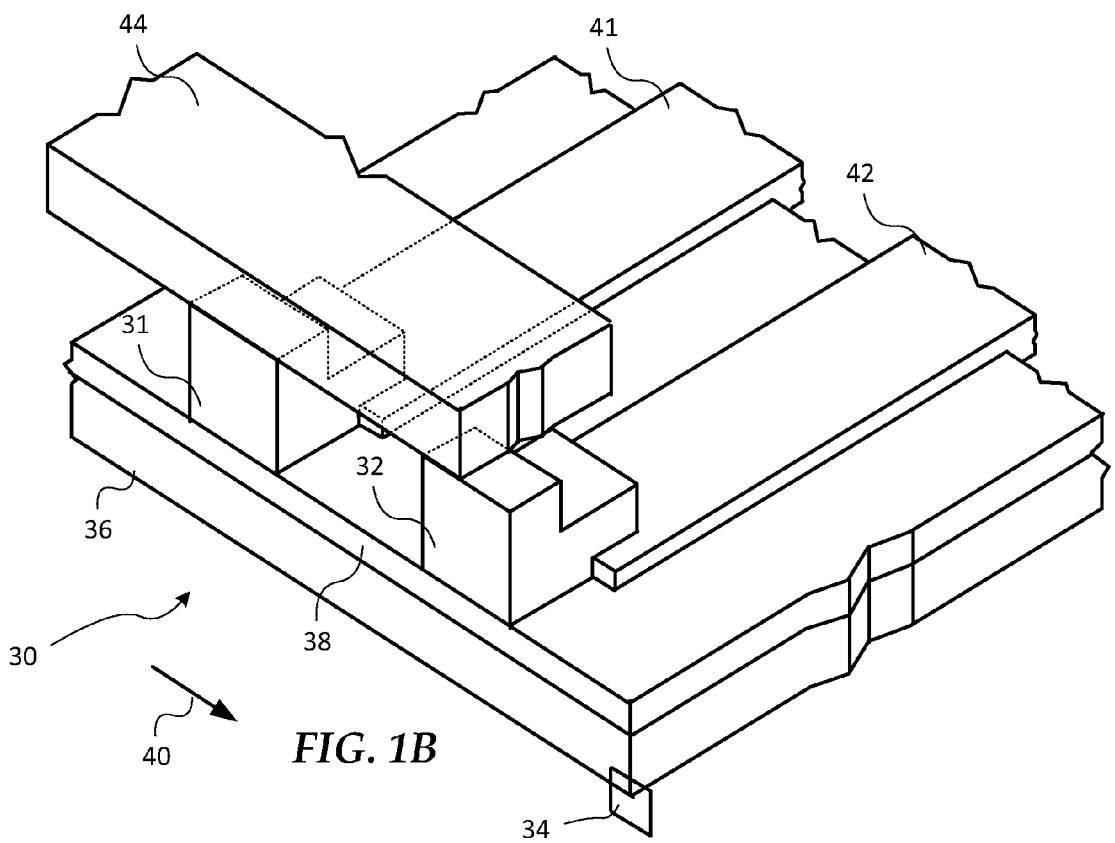
FIG. 1B is a perspective cutaway view of a portion of a read head according to an example embodiment.

In FIG. 1B, a cutaway, perspective view shows a portion of a read head 30 according to an example embodiment. The view shows left and right reader stacks 31, 32 that are located at a media facing surface 34. For purposes of this disclosure, the term "left" and "right" is used to distinguish between separate reader components, and is not meant to imply any particular orientation of the components relative to the read head, medium, etc. The read head includes a bottom shield 36 and an electrical isolation layer 38 that electrically isolates the left and right reader stacks 31, 32 from the bottom shield 36. The left and right reader stacks 31, 32 are cross-track adjacent to one another, the cross-track direction being indicated by arrow 40. The left and right reader stacks 31, 32 include bottom layers disposed on at least part of the isolation layer 38.

Left and right bottom contacts 41, 42 are electrically coupled to respective left and right reader stacks 31, 32. While not seen in this view, the isolation layer 38 also electrically isolates the bottom shield 36 from the bottom contacts 41, 42. A top shield 44 is configured as a common top contact electrically coupled to respective top layers of the left and right reader stacks 31, 32. This arrangement allows the bottom and top shields 36, 44 to be contiguous under both readers, while providing electrically isolated contacts 41, 42 used for transmitting signals generated by the reader stacks 31, 32.

It will be understood that many variations of an adjacent reader are possible. For example, in an alternate arrangement, the reader stacks 31, 32 may be commonly coupled to the bottom shield 26 and isolated from the top shield 44. In such an arrangement, separate top contacts, similar to bottom contacts 41, 42, are coupled to tops of read stacks 31, 32. In other embodiments, three or more reader stacks may be used, all of them coupled to a common shield (e.g., top or bottom), and isolated from another of the shields, with separate contacts coupled to ends of the stacks that correspond to the isolated shields. Other coupling arrangements are also possible, discussed in greater detail below.

In FIGS. 2A-2D, block diagrams illustrate an embodiment of a read head 50 having adjacent left and right reader stacks 52 and 54, respectively. FIG. 2A is a plan view of a media-reading surface 56 of the read head 50. FIGS. 2B and 2C are sectional views along lines 2B-2B and 2C-2C, respectively, of the read head 50 shown in FIG. 2A. FIG. 2D is an electrical circuit representation of the read head 50. The illustrated left and right reader stacks 52 and 54 are each configured as top spin valve (TSV) readers. It will be understood that the illustrated embodiment may be used with other configurations, such as bottom spin valve readers (BSV), which invert the order of some layers.

As shown, the left reader stack 52 includes a bottom/seed layer 52a disposed on a first portion 58a of a common bottom isolation layer 58. The seed layer 52a is followed by an anti-ferromagnetic (AF) layer 52b, a synthetic anti-ferromagnetic (SAF) layer 52c, a spacer/barrier 52d, a free layer 52e, and a top/cap layer 52f. Likewise, the right reader stack 54 includes a bottom/seed layer 54a disposed on the first portion 58a of the bottom isolation layer 58. The right reader stack 54 further includes an AF layer 54b, an SAF layer 54c, a spacer/barrier 54d, a free layer 54e, and a top/cap layer 54f. The common bottom isolation layer 58 is that electrically isolate the reader stacks 52 and 54 from a common bottom shield 60. In some embodiments, the bottom isolation layer 58 may be configured as a magnetic or a non-magnetic layer. Side shields 68, 70 and 72 encompass the reader stacks 52 and 54. In some embodiments, the side shields 68, 70 and 72 may be configured as permanent magnets.

The left and right reader stacks 52 and 54 include relatively long SAF/AF structures 52bc and 54bc, respectively, extending distally from the media-reading surface 56. A region behind the SAF/AF structures 52bc and 54bc is filled with an isolation material 74. As illustrated, each SAF/AF structure includes at least one AF layer and at least one SAF layer. The long SAF/AF structures 52bc and 54bc may improve the stability of the AF/SAF layers of the read head 50. While the reader stacks 52 and 54 are illustrated and described as having relatively long SAF/AF structures 52bc and 54bc, such configurations or structures should not be construed as a requirement and/or as a limitation of the embodiments disclosed herein. It should be apparent to one skilled in the art that any of the one or more AF and SAF layers 52b, 52c, 54b and 54c can be a short layer and/or a standard length layer extending distally from the media-reading surface 56.

The read head 50 further includes left and right bottom contacts 62 and 64 electrically coupled to a distal portion of the respective SAF/AF structures 52bc and 54bc of the left and right reader stacks 52 and 54. As best seen in FIG. 2B the right bottom contact 64 is electrically coupled to at least a distal portion of the AF layer 54b of the SAF/AF structure 54bc, and is disposed between the AF layer 54b and a second portion 58b of the common bottom isolation layer 58. Likewise, the left bottom contact 62 is electrically coupled to at least a distal portion of the AF layer 52b of the SAF/AF structure 52bc, and is disposed between the AF layer 52b and the second portion 58b of the common bottom isolation layer 58. As shown, the right bottom contact 64 is recessed (e.g., located distally) from the media-reading surface 56 of the read head 50. The left bottom contact is likewise recessed from the media-reading surface 56 of the read head 50.

The common bottom isolation layer 58 electrically isolates the left and right bottom contacts 62 and 64 of the respective left and right reader stacks 52 and 54 from a common bottom shield 60. In some embodiments, the bottom isolation layer 58 may be configured as a magnetic or a non-magnetic layer.

The read head 50 further includes a common top shield 66 disposed on, and electrically coupled to, the top/cap layers 52f and 54f of the left and right reader stacks 52 and 54, respectively. The top shield 66 is configured as a common top contact 66 shared by both left and right reader stacks 52 and 54. As best seen in FIG. 2D, the left bottom contact 62 and the common top contact 66 are used by the left reader stack 52, and the right bottom contact 64 and the common top contact 66 are used by the right reader stack 52. As such, the read head 50 includes three electrical contacts and two adjacent reader stacks. Accordingly, the read head 50 is referred to as having a "three-contact, two-reader" structure or configuration. As will be apparent to one skilled in the art, configuring the top shield 66 as the common top electrical contact 66 shared by the left and right reader stacks 52 and 54 minimizes the number of electrical leads required for the read head 50. This allows for independent electrical contacts with little or no increase in the shield-to-shield spacing (e.g., downtrack spacing between shields 60 and 66).

It will be understood that the embodiment shown in FIGS. 2A-2D may be extended to include addition reader stacks, e.g., with side shields 68 and/or 72 being disposed between two reader stacks. The additional stacks may be commonly coupled to the top shield 66, isolated from bottom shield 60 via isolation layer 58, with additional contacts coupled to the bottoms of the additional reader stacks.

In another arrangement, bottom layers 52a, 54a of reader stacks 52, 54 may be commonly coupled to the bottom shield 60, and an isolation layer (not shown, but similar to isolation layer 58) may separate the tops of the reader stacks 52, 54 from the top shield 66. In such an arrangement, contacts similar to contacts 62 and 64 may instead be electrically coupled to the top layers 52f, 54f of the reader stacks 52, 54.

FIGS. 3A-3D illustrate another embodiment of a "three-contact two-reader" read head 100 having adjacent left and right reader stacks 102 and 104, respectively. FIG. 3A is a plan view of a media-reading surface 106 of the read head 100. FIGS. 3B and 3C are sectional views along lines 3B-3B and 3C-3C, respectively, of the read head 100 shown in FIG. 3A. FIG. 3D is an electrical circuit representation of the read head 100. The illustrated left and right reader stacks 102 and 104 are each configured as TSV readers, although other stack configurations may be used.

As shown, the left reader stack 102 includes a bottom/seed layer 102a disposed on a common bottom isolation layer 108. The seed layer 102a is followed by an AF layer 102b, an SAF layer 102c, a spacer/barrier 102d, a free layer 102e, and a top/cap layer 102f. Likewise, the right reader stack 104 includes a bottom/seed layer 104a disposed on the common bottom isolation layer 108. The right reader stack 104 further includes an AF layer 104b, an SAF layer 104c, a spacer/barrier 104d, a free layer 104e, and a top/cap layer 104f. The common bottom isolation layer 108 is that electrically isolate the reader stacks 102 and 104 from a common bottom shield 110. In some embodiments, the bottom isolation layer 108 may be configured as a magnetic or a non-magnetic layer. Side shields 118, 120 and 122 encompass the reader stacks 102 and 104. In some embodiments, the side shields 118, 120 and 122 may be configured as permanent magnets.

In some embodiments of the read head 100, the left and right reader stacks 102 and 104 include relatively long SAF/AF structures 102bc and 104bc, respectively, extending distally from the media-reading surface 106. As illustrated, each SAF/AF structure includes at least one AF layer and at least one SAF layer. The reader stacks 102 and 104 are illustrated as having relatively long SAF/AF structures 102bc and 104bc, although such configurations or structures should not be construed as a requirement and/or as a limitation of the embodiments disclosed herein. It should be apparent to one skilled in the art that any of the one or more AF and SAF layers 102b, 102c, 104b and 104c can be a short layer and/or a standard length layer extending from the media-reading surface 106.

The read head 100 further includes left and right bottom contacts 112 and 114 electrically coupled to a distal portion of the respective SAF/AF structures 102bc and 104bc of the left and right reader stacks 112 and 114. In contrast to the left and right bottom contacts 62 and 64 of the read head 50, the left and right bottom contacts 112 and 114 of the read head 100 are electrically coupled to the respective SAF layers 102c and 104c of the left and right reader stacks 102 and 104.

In some embodiments, the left and right bottom contacts 112 and 114 is disposed on a distal portion of the respective SAF/AF structures 102bc and 104bc of the left and right reader stacks 102 and 104. As best seen in FIG. 3B, the right bottom contact 114 is disposed on, and electrically coupled to, a distal portion of the SAF layer 104c of the right reader stack 104. Likewise, the left bottom contact 112 is disposed on, and electrically coupled to, a distal portion of the SAF layer 102c of the left reader stack 102. As shown, the right bottom contact 114 is recessed (e.g., located distally) from the media-reading surface 106 of the read head 100. The left bottom contact 112 is likewise recessed from the media-reading surface 106 of the read head 100.

The read head 100 further includes left and right top isolation layers that electrically isolate the corresponding left and right bottom contacts 112 and 114 from a common top shield 116. The common top shield 116 is configured as a common top contact 116 shared by the left and right reader stacks 102 and 104. As best seen in FIG. 3B, a right top isolation layer 124 is disposed between the right bottom contact 114 and the common top contact 116. Likewise, the left top isolation layer is disposed between the left bottom contact 112 and the common top contact 116. In some embodiments, the left and right top isolations layers are that electrically isolate the left and right bottom contacts 112 and 114 from the common top shield 116.

The common top shield 116 is disposed on, and electrically coupled to, the top/cap layers 102f and 104f of the left and right reader stacks 102 and 104, respectively. As such, the common top shield 116 is configured as a common top contact 116 shared by the left and right reader stacks 102 and 104. As best seen in FIG. 3D, the left bottom contact 112 and the common top contact 116 are used by the left reader stack 102, and the right bottom contact 114 and the common top contact 116 are used by the right reader stack 102. As such, the read head 100 includes three electrical contacts and two adjacent reader stacks. Accordingly, the read head 100 is referred to as having a "three-contact two-reader" structure or configuration. As will be apparent to one skilled in the art, configuring the top shield 116 as the common top electrical contact 116 shared by the left and right reader stacks 102 and 104 minimizes the number of electrical leads required for the read head 100.

FIGS. 4A-4D illustrate an embodiment of a "four-contact two-reader" read head 150 having adjacent left and right reader stacks 152 and 154, respectively. FIG. 4A is a plan view of a media-reading surface 156 of the read head 150. FIGS. 4B and 4C are sectional views along lines 4B-4B and 4C-4C, respectively, of the read head 150 shown in FIG. 4A. FIG. 4D is an electrical circuit representation of the read head 150. The illustrated left and right reader stacks 152 and 154 are each configured as top spin valve (TSV) readers, although other stack configurations may be used.

As shown, the left reader stack 152 includes a bottom/seed layer 152a disposed on a first portion 158a of a common bottom isolation layer 158. The seed layer 152a is followed by an anti-ferromagnetic (AF) layer 152b, a synthetic anti-ferromagnetic (SAF) layer 152c, a spacer/barrier 152d, a free layer 152e, and a top/cap layer 152f. Likewise, the right reader stack 154 includes a bottom/seed layer 154a disposed on the first portion 158a of the bottom isolation layer 158. The right reader stack 154 further includes an AF layer 154b, an SAF layer 154c, a spacer/barrier 154d, a free layer 154e, and a top/cap layer 154f. The common bottom isolation layer 158 is that electrically isolate the reader stacks 152 and 154 from a common bottom shield 160. In some embodiments, the bottom isolation layer 158 may be configured as a magnetic or a non-magnetic layer. Side shields 168, 170 and 172 encompass the left and right reader stacks 152 and 154. In some embodiments, the side shields 168, 170 and 172 may be configured as permanent magnets.

In some embodiments of the read head 150, the left and right reader stacks 152 and 154 include relatively long SAF/AF structures 152bc and 154bc, respectively, extending distally from the media-reading surface 156. As illustrated, each SAF/AF structure includes at least one AF layer and at least one SAF layer. The long SAF/AF structures 152bc and 154bc may improve the stability of the AF/SAF layers of the read head 150.

While the reader stacks 152 and 154 are illustrated as having relatively long SAF/AF structures 152bc and 154bc, such configurations or structures should not be construed as a requirement and/or as a limitation of the embodiments disclosed herein. It should be apparent to one skilled in the art that any of the one or more AF and SAF layers 152b, 152c, 154b and 154c can be a short layer and/or a standard length layer extending distally from the media-reading surface 156. Each SAF/AF structure 152bc and 154bc may include a relatively wide flare angle as it extends distally from the media-reading surface 156, e.g., similar to the flaring of contacts 174 and 176 in FIG. 4C. Wide flare angles of the SAF/AF structures 152bc and 154bc may increase the area available for contact alignment, increase SAF volume, and lower the lead resistance for the corresponding left and right reader stacks 152 and 154.

The read head 150 further includes left and right bottom contacts 162 and 164 electrically coupled to a distal portion of the respective bottom/seed layers 152a and 154a of the left and right reader stacks 152 and 154. As best seen in FIG. 4B, the right bottom contact 164 is electrically coupled to a distal portion of the bottom/seed layer 154a, and is disposed between the bottom/seed layer 154a and a second portion 158b of the common bottom layer 158. Likewise, the left bottom contact 162 is electrically coupled to a distal portion of the bottom/seed layer 152a, and is disposed between the bottom/seed layer 152a and a second portion 158b of the common bottom layer 158. As shown, the right bottom contact 164 is recessed (e.g., located distally) from the media-reading surface 156 of the read head 150. The left bottom contact 162 is likewise recessed from the media-reading surface 156 of the read head 150. The common bottom isolation layer 158 is further that electrically isolate the left and right bottom contacts 162 and 164 from the common bottom shield 160.

The read head 150 also includes left and right top contacts 174 and 176 for the left and right reader stacks 152 and 154, respectively. As best seen in FIG. 4B, the right top contact 176 is disposed on a right isolation layer 178, and the right top contact 176 is electrically coupled to the free layer 154e and to the top/cap layer 154f of the right reader stack 154. The right isolation layer 178 is that electrically isolate the right top contact 176 from the spacer/barrier 154d of the right reader stack 154.

In some embodiments, the right top contact 176 is formed with an abutted lead structure to a backside of the free layer 154e and to a backside of the top/cap layer 154f of the right reader stack 154. Likewise, the left top contact 174 is disposed on a left isolation layer, and the left top contact 174 is electrically coupled to the free layer 152e and to the top/cap layer 152f of the left reader stack 152. The left isolation layer is likewise that electrically isolate the left top contact 174 from the spacer/barrier 152d of the left reader stack 152. In some embodiments, the left top contact 174 is formed with an abutted lead structure to a backside of the free layer 152e and to a backside of the top/cap layer 152f of the left reader stack 152.

The read head 150 further includes left and right top isolation layers 180 and 182 that electrically isolate the respective left and right reader stacks 152 and 154 and the respective left and right top contacts 174 and 176 from a common top shield 166. As best seen in FIG. 4B, the right top isolation layer 182 extends between the common top shield 166 and the top/cap layer 154f and the right top contact 176 of the right reader stack 154. Likewise, the left top isolation layer 180 extends between the common top shield 166 and the top/cap layer 152f and the left top contact 174 of the left reader stack 152. In some embodiments, one or both of the left and right top isolation layers 180 and 182 may be configured as magnetic or non-magnetic layers.

In contrast to the read heads 10, 50 and 100, each left and right reader stack 152 and 154 includes an independent pair of top and bottom contacts. In other words, the read head 150 does not include any contacts that are common to and/or shared by the left and right reader stack 152 and 154. As best seen in FIG. 4D, the left bottom contact 162 and the left top contact 174 are used for the left reader stack 152, and the right bottom contact 164 and the right top contact 176 are used for the right reader stack 154. As such, the read head 150 includes four electrical contacts and two adjacent reader stacks. Accordingly, the read head 150 is referred to as having a "four-contact two-reader" structure or configuration.

FIGS. 5A-5D illustrate an alternate embodiment of a "four-contact two-reader" read head 200 having adjacent left and right reader stacks 202 and 204, respectively. FIG. 5A is a plan view of a media-reading surface 206 of the read head 200. FIGS. 5B and 5C are sectional views along lines 5B-5B and 5C-5C, respectively, of the read head 200 shown in FIG. 5A. FIG. 5D is an electrical circuit representation of the read head 200.

As shown, the left reader stack 202 includes a bottom/seed layer 202a disposed on a first portion 208a of a common bottom isolation layer 208. The seed layer 202a is followed by an AF layer 202b, an SAF layer 202c, a spacer/barrier 202d, a free layer 202e, and a top/cap layer 202f. In contrast to the left reader stack 152, the left reader stack 202 further includes a left in-stack shield 202g configured as an electrical contact. The left in-stack shield 202g is electrically coupled to the top/cap layer 202f. Likewise, the right reader stack 204 includes a bottom/seed layer 204a disposed on the first portion 208a of the common bottom isolation layer 208.

The right reader stack 204 further includes an AF layer 204b, an SAF layer 204c, a spacer/barrier 204d, a free layer 204e, and a top/cap layer 204f. In contrast to the right reader stack 154, the right reader stack 204 further includes a right in-stack shield 204g configured as an electrical contact. The right in-stack shield 204g is electrically coupled to the top/cap layer 204f. As illustrated in FIG. 5B, the right reader stack 204 also includes an isolation layer 228 disposed between the spacer/barrier 204d and the right in-stack shield 204g. The isolation layer 228 may extend to separate the spacer/barrier 202d and the right in-stack shield 202g of the left reader stack 202. In another embodiment, a separate isolation layer (not shown) may be used instead of extending layer 202d.

The common bottom isolation layer 208 electrically isolates the left and right reader stacks 202 and 204 from a common bottom shield 210. In some embodiments, the bottom isolation layer 208 may be configured as a magnetic or a non-magnetic layer. Side shields 218, 220 and 222 encompass the left and right reader stacks 202 and 204. In some embodiments, the side shields 218, 220 and 222 may be configured as permanent magnets.

The read head 200, the left and right reader stacks 202 and 204 may include relatively long SAF/AF structures 202bc and 204bc, respectively, extending distally from the media-reading surface 206. It should be apparent to one skilled in the art that any of the one or more AF and SAF layers 202b, 202c, 204b and 204c can be a short layer and/or a standard length layer extending distally from the media-reading surface 206. In some embodiments of the read head 200, each SAF/AF structure 202bc and 204bc may have a relatively wide flare angle as it extends distally from the media-reading surface 206, such as shown for the contacts 224, 226 in FIG. 5C.

The read head 200 further includes left and right bottom contacts 212 and 214 electrically coupled to a distal portion of the respective bottom/seed layers 202a and 204a of the left and right reader stacks 202 and 204. As best seen in FIG. 5B, the right bottom contact 214 is electrically coupled to a distal portion of the bottom/seed layer 204a, and is disposed between the bottom/seed layer 204a and a second portion 208b of the common bottom layer 208. As shown, the right bottom contact 214 is recessed (e.g., located distally) from the media-reading surface 206 of the read head 200. Likewise, the left bottom contact 212 is electrically coupled to a distal portion of the bottom/seed layer 202a, and is disposed between the bottom/seed layer 202a and the second portion 208b of the common bottom layer 208. The left bottom contact 212 is also recessed from the media-reading surface 206 of the read head 200. The common bottom isolation layer 208 electrically isolates the left and right bottom contacts 212 and 214 from the common bottom shield 210.

The read head 200 also includes left and right top contacts 224 and 226 for the left and right reader stacks 202 and 204, respectively. As best seen in FIG. 5B, the right top contact 226 is electrically coupled to the right in-stack shield 204g of the right reader stack 204. Likewise, the left top contact 224 is electrically coupled to the left in-stack shield 202g of the left reader stack 202.

The read head 200 further includes left and right top isolation layers 230 and 232 that electrically isolate the left and right reader stacks 202 and 204, respectively, and the corresponding left and right top contacts 224 and 226 from a common top shield 216. As illustrated in FIG. 5A, the left and right isolation layers 230 and 232 is disposed between the corresponding left and right in-stack shields 202g and 204g and the common top shield 216. The isolation layers 230 and 232 may be formed of a common layer that is separated near the media-facing surface by the shield 220.

As shown in FIG. 5B, the right top isolation 232 extends distally from the media-reading surface 206 and electrically isolates the right in-stack shield 204g and the right top contact 226 from the common top shield 216. Likewise, the left top isolation 230 extends distally from the media-reading surface 206 and electrically isolates the left in-stack shield 202g and the left top contact 224 from the common top shield 216. One or both of the left and right top isolation layers 230 and 232 may be configured as magnetic or non-magnetic layers.

Each left and right reader stack 202 and 204 includes an independent pair of top and bottom contacts. In other words, the read head 200 does not include any contacts that are common to and/or shared by the left and right reader stacks 202 and 204. As best seen in FIG. 5D, the left bottom contact 212 and the left top contact 224 are used for the left reader stack 202, and the right bottom contact 214 and the right top contact 226 are used for the right reader stack 204. As such, the read head 200 includes four electrical contacts and two adjacent reader stacks. Accordingly, the read head 200 is referred to as having a "four-contact two-reader" structure or configuration.

Figure 6:
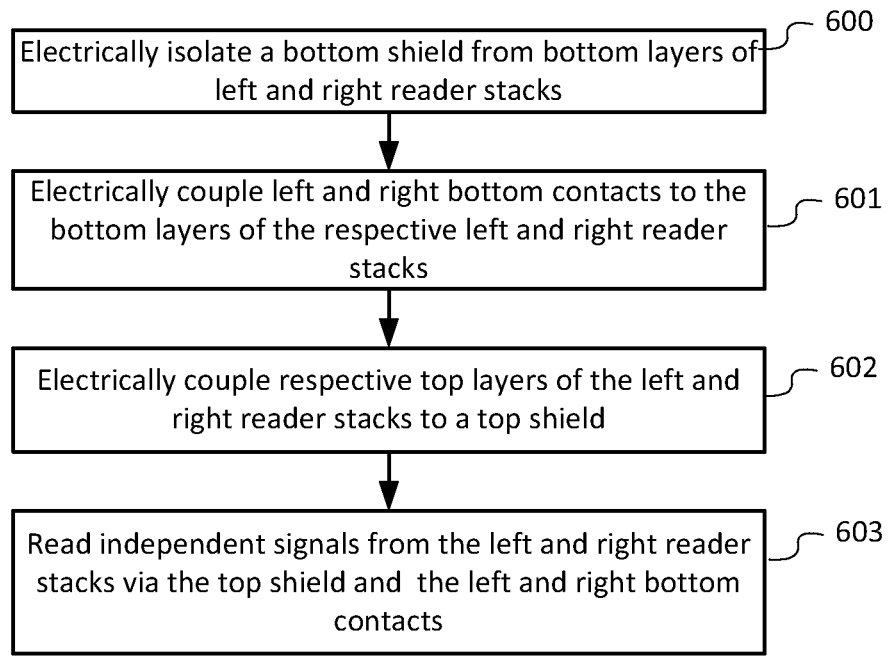
FIGS. 6 and 7 are flowcharts illustrating methods according to example embodiments.
Figure 7:
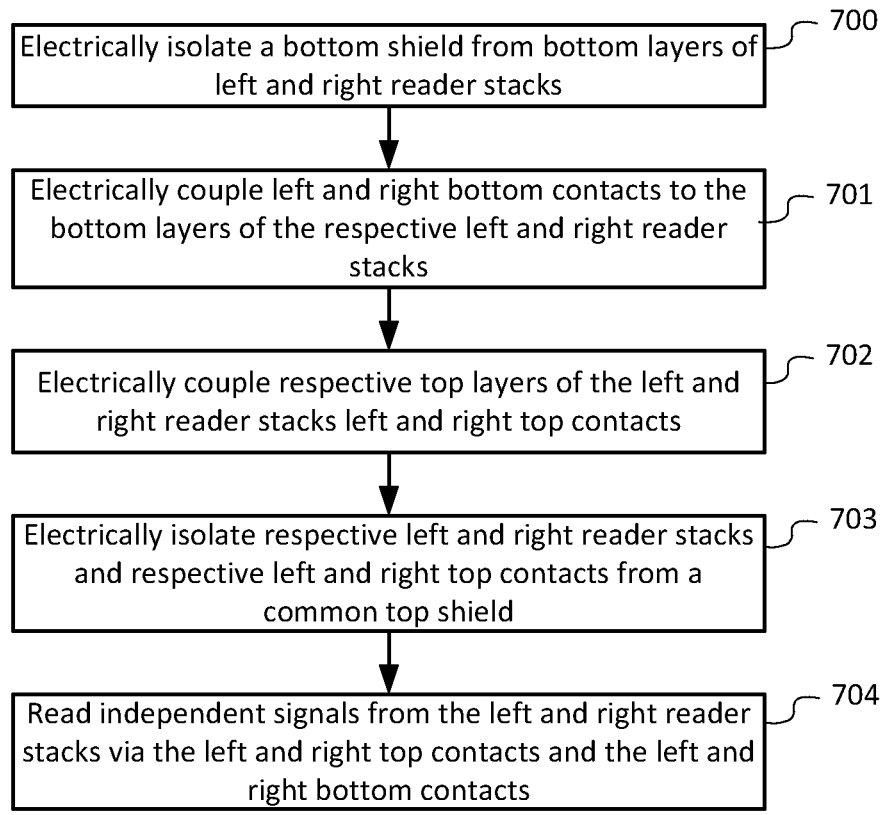

In FIG. 6, a flowchart shows a method according to an example embodiment. The method involves electrically isolating 600 a bottom shield from bottom layers of left and right reader stacks. Left and right bottom contacts are electrically coupled 601 to respective bottom layers of the stacks. Top layers of the left and right reader stacks are electrically coupled 602 to a top shield. Independent signals are read 603 from the left and right reader stacks via the top shield and left and right bottom contacts. The signals may be read via a preamplifier, and simultaneously or separately processed, e.g., via a TDMR encoder.

In FIG. 6, a flowchart shows a method according to another example embodiment. The method involves electrically isolating 700 a bottom shield from bottom layers of left and right reader stacks. Left and right bottom contacts are electrically coupled 701 to respective bottom layers of the stacks. Top layers of the left and right reader stacks are electrically coupled 702 to respected left and right top contacts. The left and right reader stacks and left and right top contacts are electrically isolated 703 from a common top shield. Independent signals are read 704 from the left and right reader stacks via the left and right top contacts and the left and right bottom contacts. The independent signals may be read via a preamplifier, and simultaneously or separately processed, e.g., via a TDMR encoder.

It will be understood that the embodiment shown in FIGS. 2A-2D, 3A-3D, 4A-4D, and 5A-5D may be extended to include additional cross-track adjacent reader stacks. An example of this is shown in FIGS. 8A-8E. Three reader stacks 800-802 are arrayed left-to-right in a cross-track direction. Side shields 804-807 reside at the cross track edges of respective reader stacks 800-802, and top and bottom shields 808, 809 are located downtrack of the reader stacks 800-802. The electrical coupling and shielding of the reader stacks 800-802 may be configured as shown in any of FIGS. 2A-2D, 3A-3D, 4A-4D, and 5A-5D.

If more than two reader stacks are used, a mixture of common-contact and isolated contacts may be used. For example, all of the reader stacks 800-802 may have dedicated top and bottom layer contacts isolated from each other as shown in FIG. 8B. All of the reader stacks may share a common top or bottom shield contact as shown in FIG. 8C (where top shield is common contact), the other contacts (bottom contacts in this example) being isolated from each other.

As shown in FIG. 8D, two reader stacks 800-801 may share a common contact (at the top shield 808 in this example) with the other contacts of the two stacks being separate, while reader stack 802 has both top and bottom contacts that are isolated from the first and second reader stacks 800, 801. In another arrangement, the first and second reader stack 800, 801 may share a common bottom contact at bottom shield 809, and the second reader 801 may share a common contact at the top shield 808 with the third reader stack 802. The top contact of the first reader stack 800 and the bottom contact of the third reader stack 802 are electrically isolated from the other contacts in such an arrangement. This couples the reader stacks in series, with n+1 contacts for n reader stacks. It will be understood that common contacts shared between two reader stacks need not be electrically coupled to the top or bottom shields 808, 809 as shown.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A read head, comprising:
   a bottom shield;
   a bottom isolation layer that electrically isolates the bottom shield;
   left and right reader stacks comprising respective bottom layers disposed on at least a portion of the bottom isolation layer, the left and right reader stacks being cross-track adjacent to one another;
   left and right bottom contacts electrically coupled to respective left and right bottom layers, the left and right bottom contacts being recessed from a media-reading surface of the read head; and
   a top shield configured as a common top contact electrically coupled to respective top layers of the left and right reader stacks.

2. The read head of claim 1, wherein each of the left and right reader stacks includes a synthetic anti-ferromagnetic (SAF)/anti-ferromagnetic (AF) structure comprising at least one SAF layer and at least one AF layer, wherein each SAF/AF structure extends distally from the media-reading surface of the read head.

3. The read head of claim 2, wherein
   the left bottom contact is electrically coupled to the SAF/AF structure of the left reader stack; and
   the right bottom contact is electrically coupled to the SAF/AF structure of the right reader stack.

4. The read head of claim 3, wherein the left and right bottom contacts are electrically coupled to a distal portion of the AF layer of the respective left and right reader stacks and are disposed between at least the portion of the bottom isolation layer and the AF layer of the respective left and right reader stacks.

5. The read head of claim 3, wherein the left and right bottom contacts are electrically coupled to a distal portion of the SAF layer of the respective left and right reader stacks.

6. The read head of claim 1, wherein the bottom isolation layer electrically isolates the left and right reader stacks and the left and right bottom contacts from the bottom shield.

7. The read head of claim 1, further comprising a third reader stack cross-track adjacent to the left and right reader stacks and disposed between the top and bottom shield.

8. A system comprising the read head of claim 1, the system further comprising a two-dimensional magnetic recording (TDMR) decoder coupled to the read head, the TDMR decoder processing independent signals from the left and right reader stacks.

9. A read head, comprising:
   a bottom isolation layer that electrically isolates a bottom shield;
   left and right reader stacks that are cross-track adjacent to one another, each of the left and right reader stacks comprising:
      respective bottom layers disposed on at least a portion of the bottom isolation layer; and
      a synthetic anti-ferromagnetic (SAF) / anti-ferromagnetic (AF) structure comprising at least one SAF layer and at least one AF layer, each SAF/AF structure extending distally from a media-reading surface of the read head;
   left and right bottom contacts electrically coupled to respective left and right reader stacks;
   left and right top contacts electrically coupled to at least a portion of respective top layers of the left and right reader stacks; and
   at least one top isolation layer that isolates respective left and right reader stacks and respective left and right top contacts from a common top shield.

10. The read head of claim 9, wherein the left and right bottom contacts are
    electrically coupled to a distal portion of the AF layer of the respective left and right reader stacks; and
    disposed between at least the portion of the bottom isolation layer and the AF layer of the respective left and right reader stacks.

11. The read head of claim 9, wherein the SAF/AF structure of the left and right reader stacks comprise a wide flare angle extending distally from a media-reading surface of the read head.

12. The read head of claim 9, comprising at least one isolation layer disposed between the left and right top contacts and respective left and right reader stacks, wherein the at least one isolation layer electrically isolates the left and right top contacts from at least a portion of the respective left and right reader stacks.

13. The read head of claim 9, wherein the bottom isolation layer electrically isolates the left and right reader stacks and the left and right bottom contacts from the bottom shield.

14. A system comprising the read head of claim 9, the system further comprising a two-dimensional magnetic recording (TDMR) decoder coupled to the read head, the TDMR decoder processing independent signals from the left and right reader stacks.

15. A read head, comprising:
    a bottom isolation layer that electrically isolates a bottom shield;
    left and right reader stacks comprising respective bottom layers disposed on at least a portion of the bottom isolation layer, the left and right reader stacks being cross-track adjacent to one another;
    left and right bottom contacts electrically coupled to respective left and right reader stacks;
    left and right in-stack shields electrically coupled to a top layer of respective left and right reader stacks;
    left and right top contacts electrically coupled to at least a portion of respective left and right in-stack shields; and
    left and right top isolation layers that electrically isolate respective left and right in-stack shields stacks and respective left and right top contacts from a common top shield.

16. The read head of claim 15, wherein each of the left and right reader stacks includes a SAF/AF structure comprising at least one synthetic anti-ferromagnetic (SAF) layer and at least one anti-ferromagnetic (AF) layer, wherein each SAF/AF structure extends distally from a media-reading surface of the read head.

17. The read head of claim 16, wherein the left and right bottom contacts are
    electrically coupled to a distal portion of the AF layer of the respective left and right reader stacks; and
    disposed between at least the portion of the bottom isolation layer and the AF layer of the respective left and right reader stacks.

18. The read head of claim 15, wherein the left and right bottom contacts and the left and right top contacts are recessed from a media-reading surface of the read head.

* * * * *